United States Patent
Yu et al.

(10) Patent No.: US 7,689,819 B2
(45) Date of Patent: Mar. 30, 2010

(54) METHOD AND SYSTEM FOR A SELF-BOOTING ETHERNET CONTROLLER

(75) Inventors: Kelly Yu, Irvine, CA (US); Takashi Tomita, Laguna Niguel, CA (US); Jonathan F. Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 999 days.

(21) Appl. No.: 11/273,280

(22) Filed: Nov. 14, 2005

(65) Prior Publication Data

US 2007/0028084 A1 Feb. 1, 2007

Related U.S. Application Data

(60) Provisional application No. 60/703,773, filed on Jul. 29, 2005.

(51) Int. Cl.
*G06F 15/177* (2006.01)
(52) U.S. Cl. .......................................... 713/2; 711/202
(58) Field of Classification Search ...................... 713/2; 711/202
See application file for complete search history.

(56) References Cited

U.S. PATENT DOCUMENTS 6,480,948 B1 * 11/2002 Virajpet et al. .............. 711/202
2003/0196096 A1 * 10/2003 Sutton ........................ 713/181
2005/0228980 A1 * 10/2005 Brokish et al. ................. 713/2

OTHER PUBLICATIONS

Asante, EtherPaC 2000+ Series: Plug-and-Play ISA Ethernet Adapter Installation Guide, 1996.*

* cited by examiner

*Primary Examiner*—Albert Wang
(74) *Attorney, Agent, or Firm*—McAndrews, Held & Malloy, Ltd.

(57) ABSTRACT

Certain embodiments for a self-booting Ethernet controller chip (NAC) may comprise a processor within the NAC that determines whether legacy boot code is present in memory external to the NAC. If legacy boot code is present in the external memory, the NAC may boot from the legacy boot code. If the legacy boot code is not present in the external memory, the processor may boot the NAC from the self-boot code in the ROM within the NAC. The processor may also read network configuration data from the external memory. The network configuration data may be stored, for example, in a NVRAM. The processor may copy the network configuration data from the NVRAM to a RAM within the NAC while booting.

24 Claims, 9 Drawing Sheets

| Offset 0x00 | Signature 380a | Format 380b | Rsvd 380c | MAC address 380d |
|---|---|---|---|---|
| 0x04 | MAC address 380d | | | |
| 0x08 | Rsvd 380e | | | Rsvd 380e |
| 0x0c | | | | Configuration 380f |

Fig. 3d

| Offset 0x00 | Signature 380a | Format 380b | Rsvd 380c | MAC address 380d |
|---|---|---|---|---|
| 0x04 | | | | MAC address 380d |
| 0x08 | | | | Rsvd 380e |
| 0x0c | Rsvd 380e | | | Configuration 380f |
| 0x10 | Checksum 380g | Rsvd 380h | S \| ... 380i | Rsvd 380j |
| 0x14 | | | | Data Block 380k |
| ... | | | | |

Fig. 3e

METHOD AND SYSTEM FOR A SELF-BOOTING ETHERNET CONTROLLER

CROSS-REFERENCE TO RELATED APPLICATIONS/INCORPORATION BY REFERENCE

This application makes reference to, claims priority to, and claims benefit of U.S. Provisional Application Ser. No. 60/703,773 filed Jul. 29, 2005.

This application also makes reference to:

U.S. patent application Ser. No. 11/273,237 filed Nov. 14, 2005; and

U.S. patent application Ser. No. 11/273,281 filed Nov. 14, 2005.

Each of the above stated applications is hereby incorporated herein by reference in its entirety.

FIELD OF THE INVENTION

Certain embodiments of the invention relate to network devices. More specifically, certain embodiments of the invention relate to a method and system for a self-booting Ethernet Controller.

BACKGROUND OF THE INVENTION

High-speed digital communication networks over copper and optical fiber are used in many network communication and digital storage applications. Ethernet and Fiber Channel are two widely used communication protocols, and the protocols continue to evolve in response to increasing demand for higher bandwidth in digital communication systems.

The Ethernet protocol may provide collision detection and carrier sensing in the physical layer of the OSI protocol model. The physical layer, layer 1, is responsible for handling electrical, optical, opto-electrical, and mechanical requirements for interfacing to the communication media. Notably, the physical layer may facilitate the transfer of electrical signals representing an information bit stream. The physical layer may also provide services such as, for example, encoding, decoding, synchronization, clock data recovery, and transmission and reception of bit streams. Gigabit Ethernet (GbE), which initially found application in gigabit servers, is becoming widespread in personal computers, laptops, and switches, thereby providing the necessary infrastructure for handling data traffic for PCs and servers.

As the demand for higher data rates and bandwidth continues to increase, equipment vendors are employing new design techniques for manufacturing network layer 1 equipment capable of handling these increased data rates. However, the equipment vendors are also trying to limit cost rise associated with the newer equipment, if not reduce the cost, with respect to the previous generation of equipment. Chip real estate and printed circuit board (PCB) real estate are generally expensive.

Traditionally, network equipment vendors have used memory external to a processor in which to store boot code for the processor. The external memory, which may be at least one memory chip, may incur further expenses to the manufacturer in addition to a cost of the memory chip. For example, the additional cost may be due to the additional printed circuit board real estate required for the chip, and/or the increased complexity for layout of the signal traces from the memory chip to the processor, and other chips to which the memory chip may be coupled.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a self-booting Ethernet controller, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3d is an exemplary memory map format 0 for a NVRAM that may be used with the self-boot code, in accordance with an embodiment of the invention.

FIG. 3e is an exemplary memory map format 1 for a NVRAM that may be used with the self-boot code, in accordance with an embodiment of the invention.

DETAILED DESCRIPTION OF THE INVENTION

Certain embodiments of the invention may be found in a method and system for a self-booting Ethernet controller. Aspects of the method may comprise determining whether legacy boot code for booting a network adapter chip is present in a memory external to the network adapter chip. If the legacy boot code is not present in the external memory, the network adapter chip may boot from boot code within a ROM within the network adapter chip. The self-booting process may comprise execution of ROM loader code and/or self-boot code in the ROM within the network adapter chip. The Ethernet controller may also be referred to as a network adapter chip (NAC).

Figure 1:
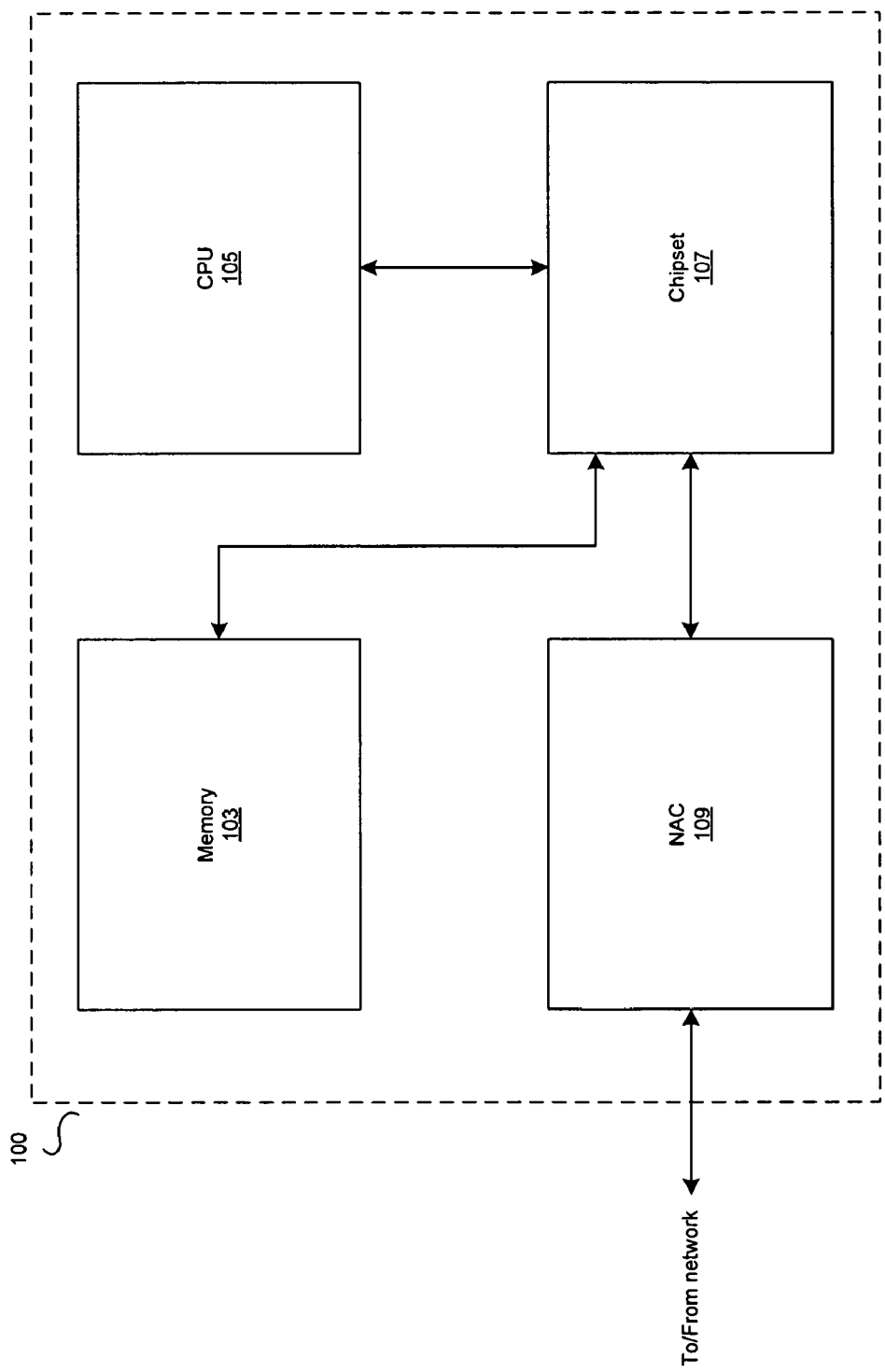
FIG. 1 is a block diagram illustrating an exemplary network interface system, which may be utilized in connection with an embodiment of the invention.

FIG. 1 is a block diagram illustrating an exemplary network interface system, which may be utilized in connection with an embodiment of the invention. Referring to FIG. 1, there is shown a laptop 100 comprising exemplary components such as a memory block 103, a CPU 105, a chipset 107, and a network adapter chip (NAC) 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status, and/or data information. The information stored in memory block 103 may be accessed by other processing blocks, for example, the CPU 105.

The CPU 105 may comprise suitable logic, circuitry, and/or code that may be adapted to process data that may be read from, for example, the memory block 103. The CPU 105 may store data in the memory block 103, and/or communicate data, status, and/or commands with other devices in the laptop, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
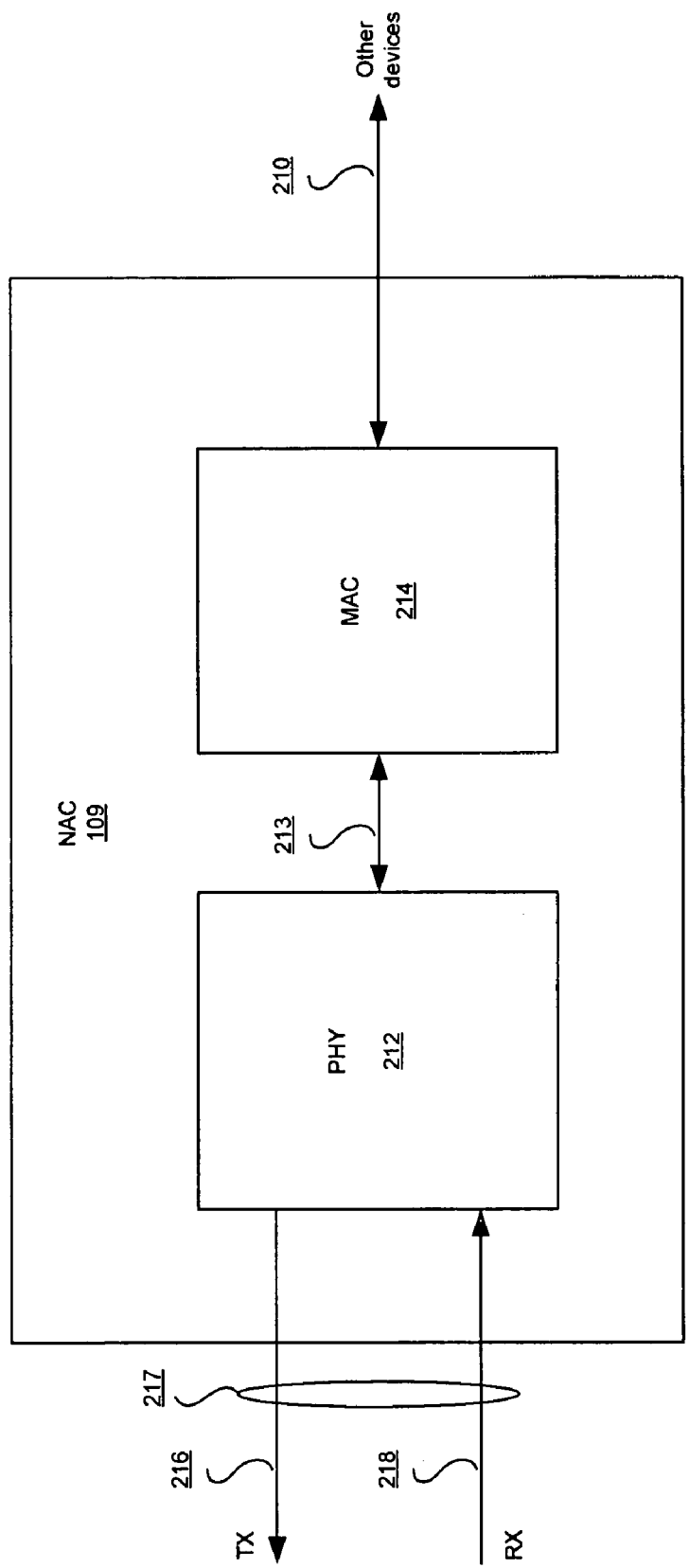
FIG. 2a is a block diagram illustrating an exemplary physical layer device and media access controller, which may be utilized in connection with an embodiment of the invention.

FIG. 2a is a block diagram illustrating an exemplary physical layer device and media access controller, which may be utilized in connection with an embodiment of the invention. Referring to FIG. 2a, there is shown the NAC 109 that may comprise a physical network interface layer (PHY) 212 and a media access controller (MAC) 214.

The PHY 212 may comprise suitable logic, circuitry, and/or code that may be adapted to interface to a network, for example, an Ethernet network. For example, the PHY 212 may be fully compatible with at least IEEE 802.3 standard for auto-negotiation of data transfer speed, where the IEEE 802.3 may be the IEEE standard for Ethernet.

The MAC 214 may comprise suitable logic, circuitry, and/or code that may be adapted to properly format data for packet transmission on, for example, the Ethernet network. The MAC 214 may also be adapted to receive data from the Ethernet network and to remove the Ethernet network related frame information so that higher level protocols may extract desired information from the received frame.

In operation, the PHY 212 may communicate data with the network via a transmit and receive interface 217. The transmit and receive interface 217 may comprise a serial transmit interface 216 and a serial receive interface 218. The PHY 212 may receive Ethernet network data via the serial receive interface 218, and transmit data to the Ethernet network via the serial transmit interface 216. The PHY 212 may sense collision when transmitting data and may comply with the Carrier Sense Multiple Access/Collision Detect (CSMA/CD) access method defined in IEEE 802.3

The MAC 214 may receive data from, for example, the CPU 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the Ethernet network via the PHY 212. The MAC 214 may remove the network related information, for example, the Ethernet protocol information, and may communicate the remaining data to, for example, the CPU 105 via, for example, a general purpose I/O (GPIO) interface 210. The CPU 105 may process the received frame to retrieve data that may have been sent by another application on the network. The GPIO bus 210 may be a general bus interface defining various pins, which may be configurable, for input and/or output usage, an interface that uses the GPIO standard, or a PCI or PCI-X interface. The particular definition of pin-outs for bus signals may be design and/or implementation dependent.

Figure 2B:
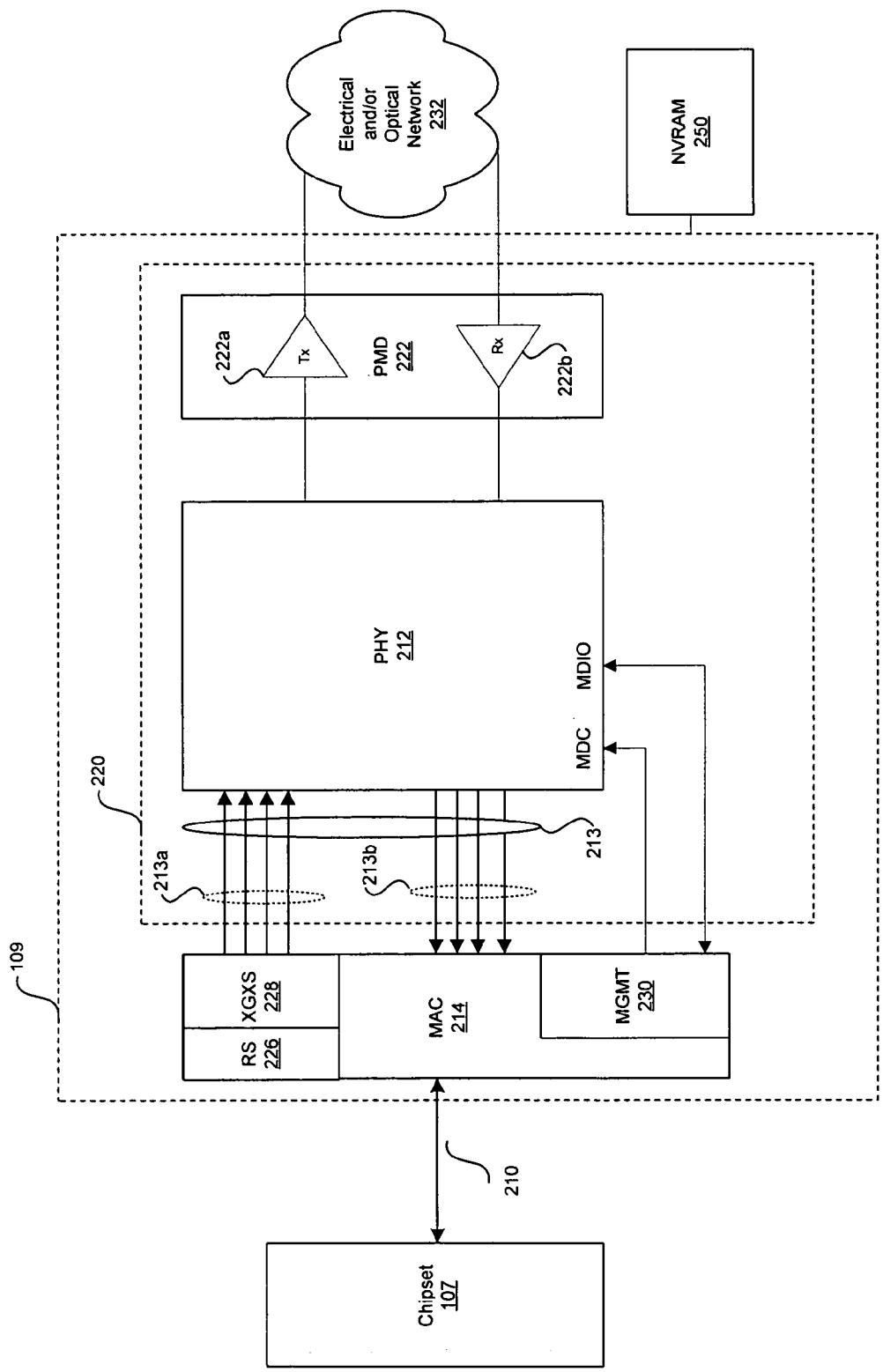
FIG. 2b is a block diagram of an exemplary Ethernet transceiver module and a media access controller, which may be utilized in connection with an embodiment of the invention.

FIG. 2b is a block diagram of an exemplary Ethernet transceiver module and a media access controller, which may be utilized with an embodiment of the invention. Referring to FIG. 2b, there is illustrated a chipset 107, a network adapter chip (NAC) 109, and a network 232. The NAC 109 may comprise the MAC 214 and a transceiver module 220. The transceiver module 220 may comprise the PHY 212, an electrically erasable programmable read only memory (EE-PROM) 224, a physical medium dependent (PMD) transceiver 222, and an NVRAM 322. The PMD transceiver 222 may comprise a PMD transmitter 222a and a PMD receiver 222b. The chipset 107 may interface with the MAC 214 through the GPIO bus 210 and may communicate with the network 232 through the transceiver module 220. The network 232 may be an electrical and/or optical network. The PMD transmitter 222a and a PMD receiver 222b may not be needed in cases when the network 232 is an electrical network.

The transceiver module 220 may be configured to communicate data between the chipset 107 and the network 232. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, a layer 1 may provide services to a layer 2 and the layer 2 may provide services to a layer 3. A data link layer, the layer 2, may include a MAC layer whose functionality may be handled by the MAC 214. In this regard, the MAC 214 may be configured to implement the well-known IEEE 802.3 Ethernet protocol.

In an embodiment of the invention, the MAC 214 may represent the layer 2 and the transceiver module 220 may represent the layer 1. The layer 3 and above may be represented by a CPU, for example, the CPU 105 (FIG. 1), which may be accessed from the NAC 109 via the chipset 107. The CPU 105 may be configured to build five highest functional layers for data packets that are to be transmitted over the network 232. Since each layer in the OSI model may provide a service to the immediately higher interfacing layer, the MAC 214 may provide the necessary services to the CPU 105 to ensure that packets are suitably formatted and communicated to the transceiver module 220. During transmission, each layer may add its own header to the data passed on from the interfacing layer above it. However, during reception, a compatible device having a similar OSI stack may strip off the headers as the message passes from the lower layers up to the higher layers.

The transceiver module 220 may be configured to handle the physical layer requirements, which may include, but is not limited to, packetizing data, data transfer, and serialization/ deserialization (SerDes). The transceiver module 220 may operate at a plurality of data rates, which may include 10 Mbps, 100 Mbps and 1 Gbps, for example. Data packets received by the transceiver module 220 from the MAC 214 may include data and header information for each of the above six functional layers. The transceiver module 220 may be configured to encode data packets that are to be transmitted over the network 232. The transceiver module 220 may also be configured to decode data packets received from the network 232.

The MAC 214 may interface with the PHY 212 through, for example, the interface 213. The interface 213 may be a low pin count, self-clocked bus. The interface 213 may act as an extender interface for a media independent interface (XMGII). In this regard, MAC 214 may also include a reconciliation sub-layer (RS) interface 226 and an XGMII extender sub-layer (XGXS) interface 228. The MAC 214 may also include an integrated link management (MGMT) interface 230 that may facilitate communication between the MAC 214 and a management data input/output (MDIO) interface of the PHY 212.

The PMD transceiver 222 may include at least one PMD transmitter 222a and at least one PMD receiver 222b. In operation, PMD transceiver 222 may be configured to receive data from and transmit data to the network 232. The PMD transmitter 222a may transmit data originating from the CPU 105. The PMD receiver 222b may receive data destined for the CPU 105 from the network 232 and transmit the data to the CPU 105 via the chipset 107. The PMD 222 may also be configured to function as an electro-optical interface. In this regard, electrical signals may be received by PMD transmitter 222a and transmitted in a format such as optical signals over the network 232. Additionally, optical signals may be received by PMD receiver 222b and transmitted as electrical signals to the chipset 107.

The NAC 109 may be coupled to the NVRAM 322 through an interface such as a serial interface or bus. The NVRAM 322 may be programmed with information such as, for example, parameters, and/or code that may effectuate the operation of the NAC 109. The parameters may include configuration data and the code may include operational code such as software and/or firmware, but the information is not limited in this regard.

Figure 3A:
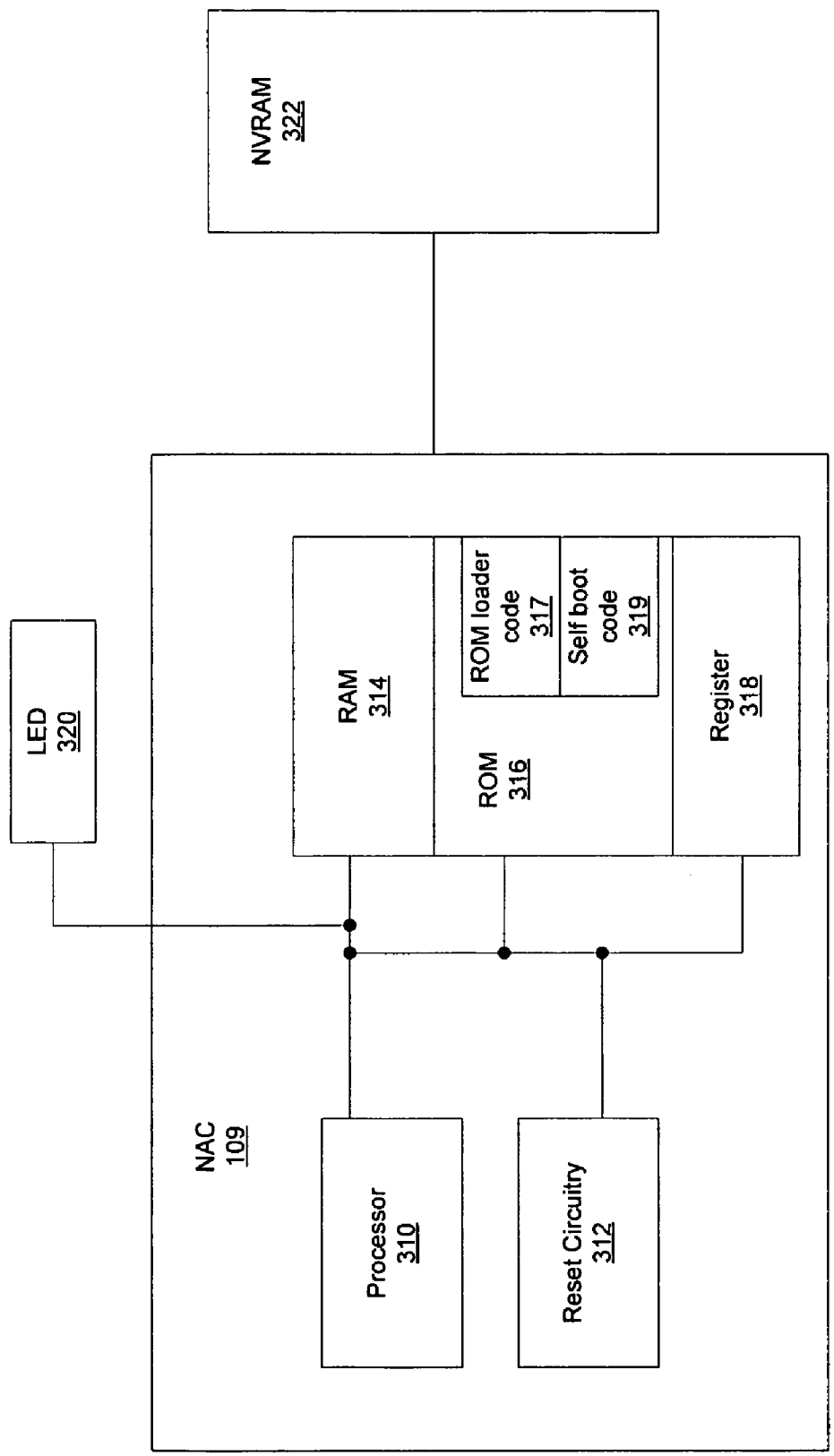
FIG. 3a is a block diagram of an exemplary network adapter chip comprising on-chip ROM loader code and on-chip self-boot code, in accordance with an embodiment of the invention.

FIG. 3a is a block diagram of an exemplary network adapter chip comprising on-chip ROM loader code and on-chip self-boot code, in accordance with an embodiment of the invention. Referring to FIG. 3a, there is shown the NAC 109, an LED 320, and a NVRAM 322. The NAC 109 that may comprise a processor 310, reset circuitry 312, RAM 314, ROM 316, and a register block 318. The register block may be hardware registers and/or a portion of the RAM 314. The NVRAM 322 may be, for example, an EEPROM or FLASH memory.

The reset circuitry 312 may comprise suitable logic and/or circuitry that may be adapted to generate a reset signal to the processor 310 during power-up. The processor 310 may use ROM loader code 317 and the self-boot code 319 that may be stored in the ROM 316 to boot the NAC 109. After a successful boot, the processor 310 may be involved in transmitting data to a network, for example, the network 232, or receiving data from the network 232. The processor 310 may use the RAM 314 to temporarily store data, for example, which is to be transmitted to the network 232, or, which has been received from the network 232. Information in the NVRAM 322 may be used during the boot and/or after the boot. Accordingly, in various embodiments of the invention, the NAC 109 may boot without using boot code stored in external memory, such as the NVRAM 322.

The register block 318 may be used to hold data. For example, a bit in a register may be used to indicate fast boot mode. The fast boot mode and fast boot is described with respect to FIGS. 3b, 3c, and 4. The LED 320 may be used to indicate, for example, an error in a boot process by either turning on the LED 320 steadily or by blinking the LED 320.

Figure 3B:
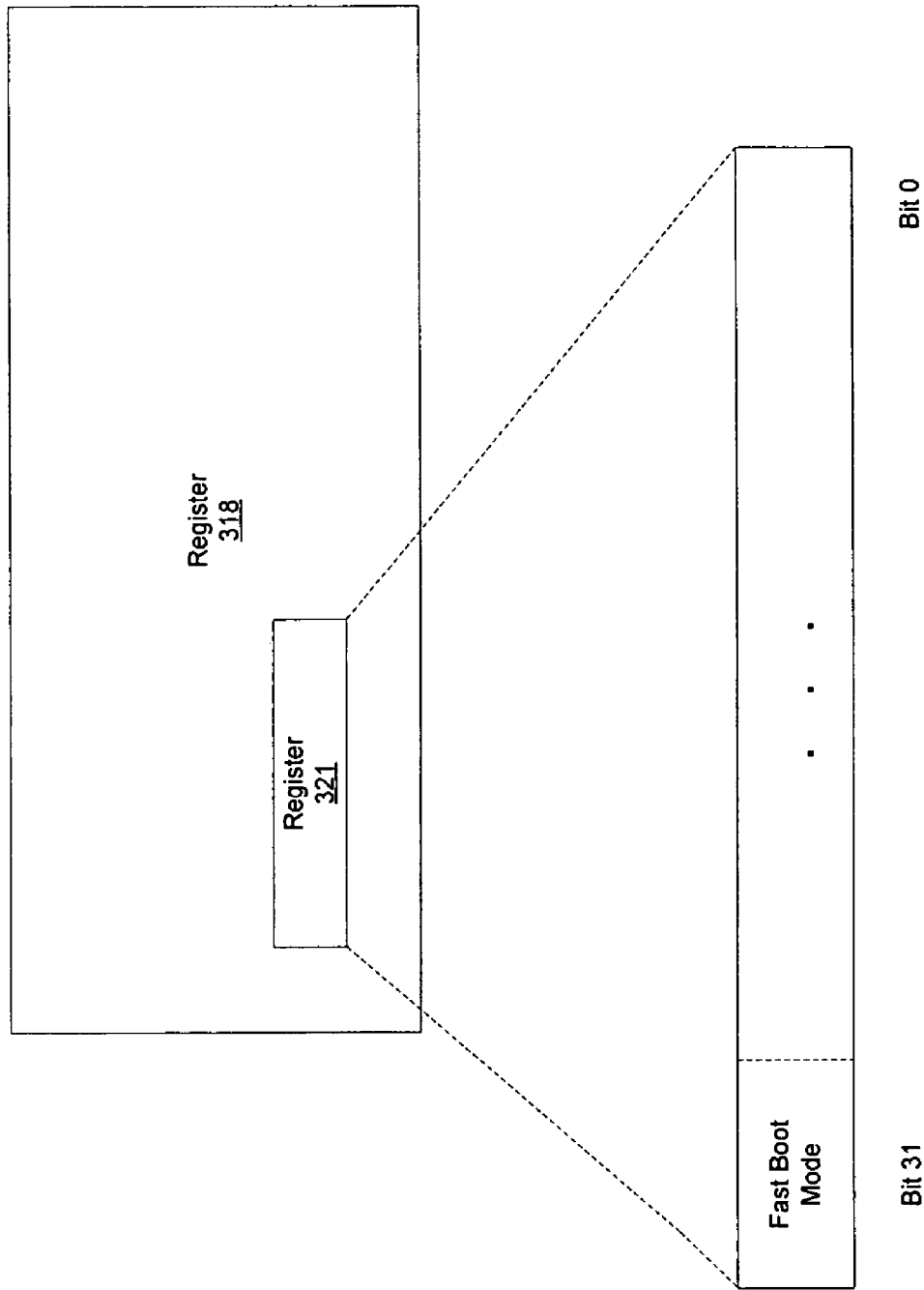
FIG. 3b is an exemplary diagram of a register comprising a fast boot mode bit, in accordance with an embodiment of the invention.

FIG. 3b is an exemplary diagram of a register comprising a fast boot mode bit, in accordance with an embodiment of the invention. Referring to FIG. 3b, there is shown the register block 318. The register block 318 may comprise a 32-bit register 321. In an exemplary embodiment of the invention, the most significant bit, bit 31, of the 32-bit register 321 may be a fast boot mode bit. The register 321 may have a register address, for example, of 0x6894. For example, the fast boot mode bit may be asserted when a fast boot code is present in the RAM 314. The fast boot code may be legacy boot code copied from, for example, the NVRAM 322 to the RAM 314. When there is no fast boot code in the RAM 314, the fast boot mode bit may be deasserted. Usage of the fast boot code bit and fast boot code is disclosed in more detail with respect to FIGS. 3c and 4. The fast boot mode bit may be assigned to any bit within a register, for example, the register 321.

Figure 3C:
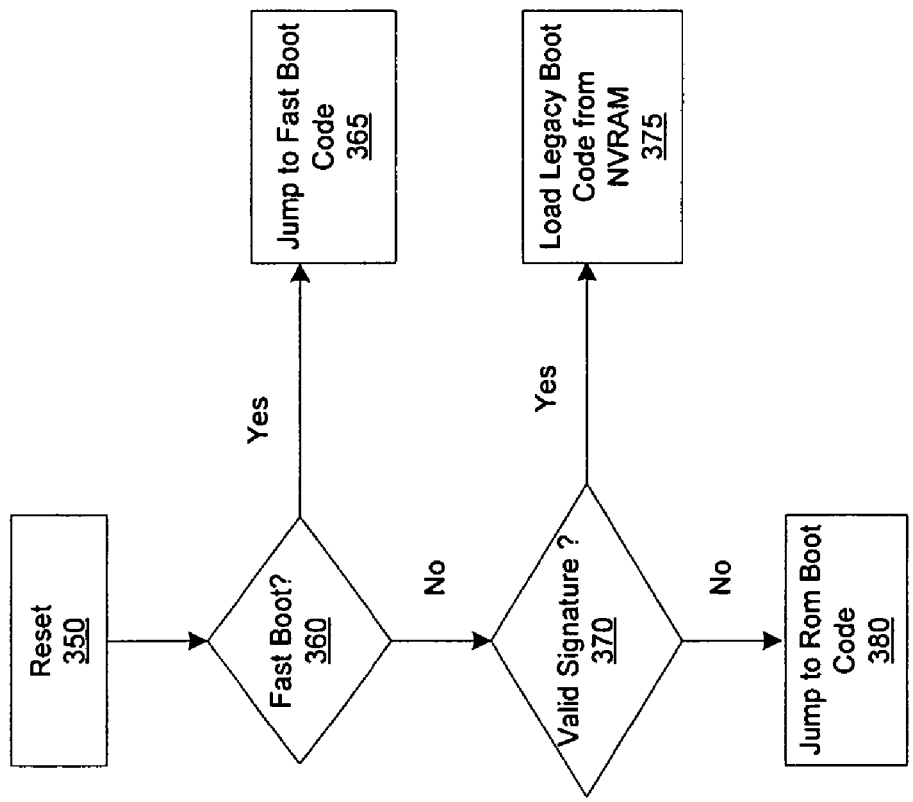
FIG. 3c is a flow chart illustrating exemplary steps for execution of a ROM loader code, in accordance with an embodiment of the invention.

FIG. 3c is a flow chart illustrating exemplary steps for execution of ROM loader code 317, in accordance with an embodiment of the invention. Step 350 may comprise a reset of the processor 310. Step 360 may determine whether a fast boot may occur. If so, the next step may be step 365 where a fast boot may occur. If a fast boot cannot occur, the next step may be step 370 where it may be determined whether a legacy boot code may be present in external memory, for example, the NVRAM 322. If it is determined that legacy boot code is present, the next step may be step 375 where the boot process may use the legacy boot code in the external memory, such as, for example, the NVRAM 322. If it is determined that the legacy boot code is not present, the next step may be step 380 where the boot process may use the self-boot code 319 in the ROM 316.

Referring to FIG. 3c, a reset may occur in step 350. The processor 310 may execute ROM loader code 317 as part of the self-booting process. The processor 310 may, for example, jump to an address of the start of the ROM loader code 317 upon a reset of the processor 310. In step 360, the instructions in the ROM loader code 317 may be executed to determine whether a fast boot bit may be asserted. In an exemplary embodiment of the invention, the fast boot bit may be, for example, bit 31 in a register at address 0x6894 in the register block 318. If the fast boot bit is asserted, the execution of instructions in the ROM loader code 317 may cause a jump to a start address of a fast boot code that may be present on RAM. Fast boot may be a feature, for example, that saves boot code loading time when the legacy boot code in the NVRAM 322 may already have been loaded in the RAM 314. For example, when the legacy boot code is in the NVRAM 322, the fast boot feature may be used when the processor 310 is reset. The processor 310 may be reset, for example, when the NAC 109 may be fully powered up after having been partially powered down. For example, the NAC 109 may have been partially powered down by a user to conserve battery power for the laptop 100.

If the fast boot bit is asserted, the next step may be step 365. In step 365, the fast boot code in the RAM 314 may be executed, and the NAC 109 may boot up. If the fast boot bit is not asserted, the next step may be step 370. In step 370, the ROM loader code 317 may execute instructions to load a signature word from a start address of the NVRAM. If the signature word at the address offset 0 is equal to a particular bit pattern, for example, 0x669955aa, the next step may be step 375. In step 375, the ROM loader code 317 may load the legacy boot code from the NVRAM 322 into the RAM 314. Further instructions in the ROM loader code 317 may be executed that may cause a jump to a start of the legacy boot code in the RAM 314. The legacy boot code in the RAM 314 may be referred to as fast boot code. After copying the legacy boot code to the RAM 314, the fast boot bit may be asserted. Accordingly, if the processor 310 is subsequently reset, booting may occur using the fast boot code.

If the signature word does not match the particular bit pattern, or if there is a failure in trying to read from the NVRAM 322, for example, because the NVRAM 322 is not present, the next step may be step 380. In step 380, further execution of the ROM loader code 317 may cause a jump to the self-boot code 319 in the ROM 316. The execution of the self-boot code 319 is disclosed in more detail with respect to FIG. 4.

FIG. 3d is an exemplary memory map format 0 for a NVRAM that may be used with the self-boot code, in accordance with an embodiment of the invention. Referring to FIG. 3d, there is shown an exemplary memory map 380 of the NVRAM 322. First four words of the NVRAM 322, for example, may comprise a signature field 380a, a format field 380b, a reserved field 380c, a MAC address field 380d, a reserved field 380e, and a configuration field 380f. Any reserved bits or unused bits may be set to, for example, zero.

The signature field 380a may identify the type of code in an NVRAM. For example, a NVRAM that supports self-boot code 319 may have a particular bit pattern, for example, 0xa5. This may indicate that the NVRAM may have supplementary code and/or information, such as, for example, code patches. The code patches may be used to modify boot functionality of the self-boot code 319. The code patch may be in native MIPS machine language or in instructions from a patch code instruction (PCI) set. Header information for each code patch may indicate whether the code patch comprises PCI format instructions or MIPS instructions. A code patch written in PCI format instructions may be decoded during the boot process. The U.S. application Ser. No. 11/273,237, filed on even date herewith, provides a detailed description of the code patch and its usage, and is hereby incorporated herein by reference in its entirety. The U.S. application Ser. No. 11/273,281, filed on even date herewith, provides a detailed description of the PCI and its usage, and is hereby incorporated herein by reference in its entirety.

If the code patch cannot be decoded during the boot process, a code patch execution error may be indicated. The error may be indicated, for example, by asserting bit 13 of the memory location 0xc10 in the RAM 314. The instruction that cannot be decoded may be ignored without causing, for example, an interrupt, exception, error handling, or halting of the processor 310. Accordingly, the error may be indicated so that the processor 310 may, at a later time, read the memory location 0xc10. The processor 310 may, at that time, store information that an error occurred while decoding a code patch. This information may be used to troubleshoot or debug the code patches and/or decoding instructions in the self-boot code 319. In an exemplary embodiment of the invention, the code patch may comprise initialization code patch (ICP) and/or service code patch (SCP).

The format field 380b may specify a type of self-boot NVRAM memory map format. For example, two exemplary NVRAM memory map formats may be format 0 and format 1. One exemplary embodiment of the invention may support up to eight formats with the present 3-bit format field 380b.

The reserved fields 380c and 380e may contain zeros. The MAC address field 380d may contain a MAC address. The MAC address may be a unique hardware address that may identify a network node. For example, the NAC 109 may be a network node, and the MAC address may be the address associated with the NAC 109.

The configuration field 380f may contain information that may determine how the NAC 109 may be configured. For example, whether the NAC 109 may be enabled or disabled, or the speed at which the NAC 109 may be used. For example, an Ethernet network may support 10 Mbps, 100 Mbps, and/or 1 Gbps data transfer rate.

The exemplary memory map format 0 for a NVRAM may, for example, comprise four words for a total of 16 bytes. The four words may be the first four words of the NVRAM 322 as described above. The format field 380b may have the value, for example, of 0x0 to indicate the format 0 for the NVRAM memory map format. The format 0 may not allow code patches.

In other embodiments of the invention, the format 0 memory map may specify a different number of bytes, and the fields described may have different number of bits. Additionally, other fields may be added and/or described fields may be removed.

FIG. 3e is an exemplary memory map format 1 for a NVRAM that may be used with the self-boot code, in accordance with an embodiment of the invention. The exemplary memory map format 1 for the NVRAM may comprise a minimum of five words. The four words may be similar to the first four words of the memory map format 0 as described with respect to FIG. 3d. The format field 380b may have the value 0x1 to indicate the format 1, for example.

The fifth word of the format 1 may comprise a checksum field 380g, reserved fields Rsvd 380h and 380j, a 6-bit flag field 380i. The 6-bit flag field 380i may comprise a SCP flag S and an ICP flag. The remaining four bits may be used for other purposes, such as, for example, relating to power supplied to the NAC 109.

There may also be an optional data block 380k. The size of the data block 380k may be as large as the size of the NVRAM 322 minus the five bytes for NVRAM memory map format 1. Checksum for the checksum field 380g may be generated by an algorithm that may, for example, add each byte of the first five words, and then perform a two's complement of the sum of the bytes. The value of the checksum field 380g may initially be zero for the purpose of generating the checksum. The generated checksum may be stored in the checksum field 380g in the fifth block. The checksum may be generated and stored at the appropriate location as part of compilation of source code and image creation for the NVRAM 322.

During execution of the ROM self-boot code 319, a checksum verification may add all bytes of the first five words, including the checksum. The resulting sum may be zero if there are no bit errors in the first five words. A non-zero result for the checksum verification may result in execution of an error routine that may retry the checksum verification. After a number of checksum verification failures, a system error may be generated that may result, for example, in ignoring data in the NVRAM 322. The response to checksum verification failure may be design and/or implementation dependent. For example, the CPU 105 may be interrupted after a checksum failure. Or, a flag may be asserted in a register or a memory location indicating a checksum failure.

The reserved fields Rsvd 380h and 380j may be, for example, zeros. The SCP flag S in the flag field 380i may be asserted if service code patch (SCP) is present in the data block. Otherwise, the SCP flag S may be deasserted. The ICP flag I in the flag field 380*i* may be asserted if initialization code patch (ICP) is present in the data block. Otherwise, the ICP flag I may be deasserted.

The data block 380k may comprise a plurality of data sub-blocks that may comprise the ICP and the SCP sub-blocks. The ICP and SCP sub-blocks may comprise initialization code patches (ICP) and the service code patches (SCP). The ICP and SCP may be instructions that may be executed in place of, or in addition to, various functions in the ROM boot code.

In other embodiments of the invention, the format 1 memory map may specify a different number of bytes, and the fields described may have different number of bits. Additionally, other fields may be added and/or described fields may be removed.

An EEPROM may be used as the NVRAM 322 for the format 0 when a small amount of data may need to be stored on the NVRAM 322. FLASH memory may be used for the format 1 when a larger amount of data may need to be stored in the NVRAM 322. Generally, for cost considerations, the smallest NVRAM that may store the necessary data may be chosen. When the format 0 is used, the NVRAM 322 may store data such as, for example, a MAC address in the MAC address field 380*d* and configuration information in the configuration field 380*h*.

With the format 1, additional information may be stored in the NVRAM 322. This information may comprise, for example, code patches that may be used to modify boot behavior for the NAC 109. The code patches may be stored in the data block 380*k*.

In accordance with some embodiments of the invention, using the NVRAM 322 for the formats 0 and 1 may not allow support certain functionalities that may be supported by legacy boot code. For example, alert standard format (ASF) and/or pre-boot execution environment (PXE) may not be supported. The ASF and PXE may be needed for remote boot capability. This may be a design and/or implementation decision where the smaller size of the NVRAM 322 for the NVRAM formats 0 and 1 that may be cheaper may be more desirable than a larger and more expensive NVRAM 322 that may have enough memory to hold the boot code.

In other embodiments of the invention, in instances where ASF and/or PXE are needed, a larger NVRAM 322 may be used. Legacy boot code may be stored in the NVRAM 322, which may be used to boot the NAC 109.

Figure 4:
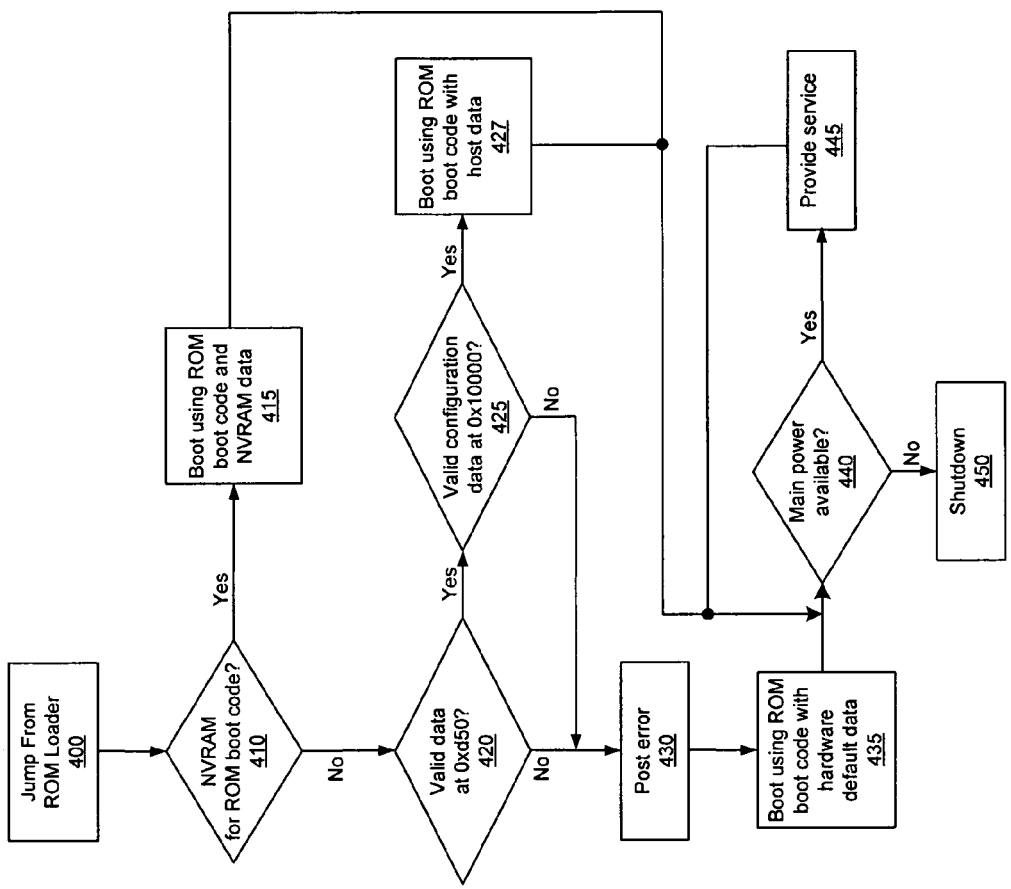
FIG. 4 is a flow chart illustrating exemplary steps for operation of self-boot code for booting the NAC 109 in FIG. 2a, in accordance with an embodiment of the invention.

FIG. 4 is a flow chart illustrating exemplary steps for operation of self-boot code for booting the NAC in FIG. 2*a*, in accordance with an embodiment of the invention. Step 400 may comprise start of booting via ROM self-boot code as a result of execution of the ROM loader code 317. Step 410 comprises determining whether a valid NVRAM may support the self-boot code 319. Step 415 comprises booting using self-boot code 319 and NVRAM boot data. Step 420 comprises determining whether data at a shared memory address indicates that boot data may have been stored in the RAM 314. Step 425 comprises verifying that valid boot data is stored in the RAM 314. Step 427 comprises booting using ROM boot code and boot data stored in the RAM 314. Step 430 comprises posting an error indicating that boot data was not present in the NVRAM 322 or in the RAM 314. Step 435 comprises booting using self-boot code 319 and hardware default data. Step 440 comprises determining whether main power is available to device being booted. Step 445 comprises providing service. Step 450 comprises shutting down a boot process because there is no main power to the device being booted.

Referring to FIG. 4, and with respect to FIGS. 1, 3*a* and 3*b*, a jump instruction in the ROM loader code 317 may be executed in step 380 in order to continue to boot the NAC 109 from the self-boot code 319. A result of the jump may be execution of the self-boot code 319 at step 400. The next step after entry in to the self-boot code 319 may be step 410. In step 410, signature data 380*a* may be read from the NVRAM 322 in order to verify whether the NVRAM 322 is a valid NVRAM. The signature data 380*a* may be compared to an expected bit pattern, for example, 0xa5. If the signature data 380*a* is the same as the expected bit pattern 0xa5, the data in the NVRAM 322 may be valid, and the next step may be step 415. Otherwise, the next step may be step 420. In step 415, the boot process may continue to boot with configuration data from the NVRAM 322. The data may comprise, for example, the MAC address 380*d*. The next step may be step 440.

In step 420, data in a shared memory address, for example, the shared memory address 0xd50 in RAM 314, may be compared to an expected bit pattern, for example, 0xa5a50000. If the data in the shared memory is same as the expected bit pattern 0xa5a50000, a host CPU, for example, the CPU 105, may have stored configuration data in the RAM 314. The configuration data may be similar to the configuration data stored in the NVRAM 322. The configuration data may be stored in the RAM 314 starting at address 0x10000, for example. Accordingly, there may be signature data 380*a* at offset 0x00 with respect to the address 0x10000.

In step 425, the configuration data in the RAM 314 may be verified to make sure it has a valid format. This may comprise, for example, reading the signature data at the offset 0 with respect to the address 0x10000. The signature data may be compared to the expected bit pattern 0xa5, for example. If the signature data is the same as the expected bit pattern 0xa5, the configuration data in the RAM 314 may be valid and the next step may be step 427. Otherwise, the next step may be step 430. In step 427, the boot process may continue to boot with the configuration data from the RAM 314. The data may comprise, for example, the MAC address 380*d*. The next step after step 427 may be step 440.

In step 430, an error may be posted. The posted error may indicate, for example, that configuration data was not found in the NVRAM 322 or in the RAM 314. This may be indicated via the LED 320, for example, by blinking the LED or by turning on the LED. A boot error may occur, for example, if there is no NVRAM and the network device is in an out-of-box (OOB) condition. In an OOB condition, a host may not have its software running to provide the configuration data for the self-boot of the NAC 109.

In step 435, the boot process may continue with default configuration data that may be present in the hardware of the NAC 109 or as part of the self-boot code 319. The continuing of the boot process at steps 415, 427, or 435 may comprise registering the NAC 109 with the network in order to be able to receive data from the network and to transmit data to the network. The steps 415, 427, and 435 may be end of the boot process.

The next step from step 435 may be step 440. In step 440, a presence of a main power supply may be verified. If the main power is not present, the next step may be step 450. If the main power is present, the next step may be step 445. In step 445, a request to the NAC 109 may be satisfied. For example, a request that may be serviced is a request to transmit data to the network. The next step after servicing a request may be step 440. In this regard, the steps 440 and 445 may comprise a service loop. In step 450, the NAC 109 may be shut down. This may occur if main power is not detected in step 440.

Another embodiment of the invention may provide a machine-readable storage, having stored thereon, a computer program having at least one code section executable by a machine, thereby causing the machine to perform the steps as described above for a self-booting network adapter chip such as a Gigabit Ethernet controller.

In accordance with an embodiment of the invention, aspects of the system may comprise the processor 310 that determines whether legacy boot code is present in a memory external to the network adapter chip 109. If legacy boot code is present in, for example, the NVRAM 322, the network adapter chip 109 may boot from the legacy boot code. If the legacy boot code is not present in the NVRAM 322, the processor 310 may boot the network adapter chip 109 from the self-boot code 319 in the ROM 316 within the network adapter chip 109. The processor 310 may read network configuration data from the memory external to the network adapter chip 109. The network configuration data may be stored, for example, in the NVRAM 322. The processor 310 may copy the network configuration data from the NVRAM 322 to the RAM 314 within the network adapter chip 109 while booting.

The processor 310 may copy the legacy boot code from the memory external to the network adapter chip 109, for example, the NVRAM 322, into the RAM 314 within the network adapter chip 109. The processor 310 may execute the legacy boot code in the RAM 314 within the network adapter chip 109. The processor 310 may indicate a fast boot mode for the legacy boot code in the RAM 314 within the network adapter chip 109. The fast boot mode may be indicated by asserting a register bit, for example, the fast boot mode bit in the register 321. The processor 310 may, in a subsequent boot, detect a fast boot mode prior to initiating execution of the self-boot code 319 in the ROM 316 within the network adapter chip 109. If the fast boot mode is detected by reading the fast boot mode bit in the register 321, the processor 310 may boot the network adapter chip 109 by executing the legacy boot code in the RAM 314 within the network adapter chip 109.

While booting from the self-boot code 319, the processor 310 may execute code patches in the NVRAM 322. The code patch may modify a flow of execution of the self-boot code 319. The code patches may be instructions from a patch code instruction set, or instructions in native machine language of the processor 310. If the instruction in the code patch is from the patch code instruction set, the processor 310 may decode and execute the code patch instructions during boot time. If the code patch instructions cannot be decoded by the processor 310, the instructions may be skipped and the processor 310 may indicate a code patch execution error. The code patch execution error may be indicated, for example, by asserting bit 13 of the memory location 0xc10 in the RAM 314.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   in a communication device comprising a network adapter chip:
   determining from within said network adapter chip, whether legacy boot code for booting said network adapter chip is present in a memory, wherein said memory is located external to said network adapter chip and located within said communication device; and
   if said legacy boot code is not present in said memory external to said network adapter chip, booting said network adapter chip from boot code in a ROM within said network adapter chip.

2. The method according to claim 1, comprising reading network configuration data from said memory external to said network adapter chip.

3. The method according to claim 2, wherein said network configuration data is stored in a NVRAM.

4. The method according to claim 2, comprising copying said network configuration data into RAM within said network adapter chip during said booting.

5. The method according to claim 1, comprising copying said legacy boot code from said memory external to said network adapter chip into RAM within said network adapter chip.

6. The method according to claim 5, comprising executing said legacy boot code in said RAM within said network adapter chip.

7. The method according to claim 5, comprising indicating a fast boot mode for said legacy boot code in said RAM within said network adapter chip.

8. The method according to claim 7, comprising asserting a register bit to indicate said fast boot mode.

9. The method according to claim 1, comprising detecting a fast boot mode prior to initiating said execution of said boot code in said ROM within said network adapter chip.

10. The method according to claim 9, comprising if said fast boot mode is detected, booting said network adapter chip by executing said legacy boot code in RAM within said network adapter chip.

11. The method according to claim 1, comprising skipping a code patch written with instructions from self-boot patch instruction set that modifies flow of execution of said boot code within said ROM if said instruction from said self-boot patch instruction set cannot be decoded.

12. The method according to claim 11, comprising indicating a code patch execution error if said instruction from said self- boot patch instruction set cannot be decoded.

13. A system, the system comprising:
one or more circuits in a communication device, said one or more circuits comprising a network adapter chip and a memory, wherein said one or more circuits enable determination, from within said network adapter chip, of whether legacy boot code for booting said network adapter chip is present in said memory, wherein said memory is located external to said network adapter chip and located within said communication device; and
if said legacy boot code is not present in said memory external to said network adapter chip, said one or more circuits enable booting of said network adapter chip from boot code in a ROM within said network adapter chip.

14. The system according to claim 13, wherein said one or more circuits enable reading of network configuration data from said memory external to said network adapter chip.

15. The system according to claim 14, wherein said network configuration data is stored in a NVRAM.

16. The system according to claim 14, wherein said one or more circuits enable copying of said network configuration data into RAM within said network adapter chip during said booting.

17. The system according to claim 13, wherein said one or more circuits enable copying of said legacy boot code from said memory external to said network adapter chip into RAM within said network adapter chip.

18. The system according to claim 17, wherein said one or more circuits enable execution of said legacy boot code in said RAM within said network adapter chip.

19. The system according to claim 17, wherein said one or more circuits enable indication of a fast boot mode for said legacy boot code in said RAM within said network adapter chip.

20. The system according to claim 19, wherein said one or more circuits enable assertion of a register bit to indicate said fast boot mode.

21. The system according to claim 13, wherein said one or more circuits enable detection of a fast boot mode prior to initiating said execution of said boot code in said ROM within said network adapter chip.

22. The system according to claim 21, wherein said one or more circuits enable booting of said network adapter chip by enabling execution of said legacy boot code in RAM within said network adapter chip if said fast boot mode is detected.

23. The system according to claim 13, wherein said one or more circuits enable skipping of a code patch written with instructions from self-boot patch instruction set that modifies flow of execution of said boot code within said ROM if said instruction from said self-boot patch instruction set cannot be decoded by said processor within said network adapter chip.

24. The system according to claim 23, wherein said one or more circuits enable indication of a code patch execution error if said code patch cannot be decoded.

* * * * *